Dec. 7, 1948.　　　　　　　F. WHITTLE　　　　　2,455,458
　　　　　THRUST AUGMENTING DEVICE FOR A SYSTEM FOR
Filed Oct. 23, 1942　　　DEVELOPING PROPULSIVE THRUST
　　　　　　　　　　　　　　　　　　　　2 Sheets-Sheet 1

Inventor,
Frank Whittle
By.
Loyd Hall Sutton
Atty.

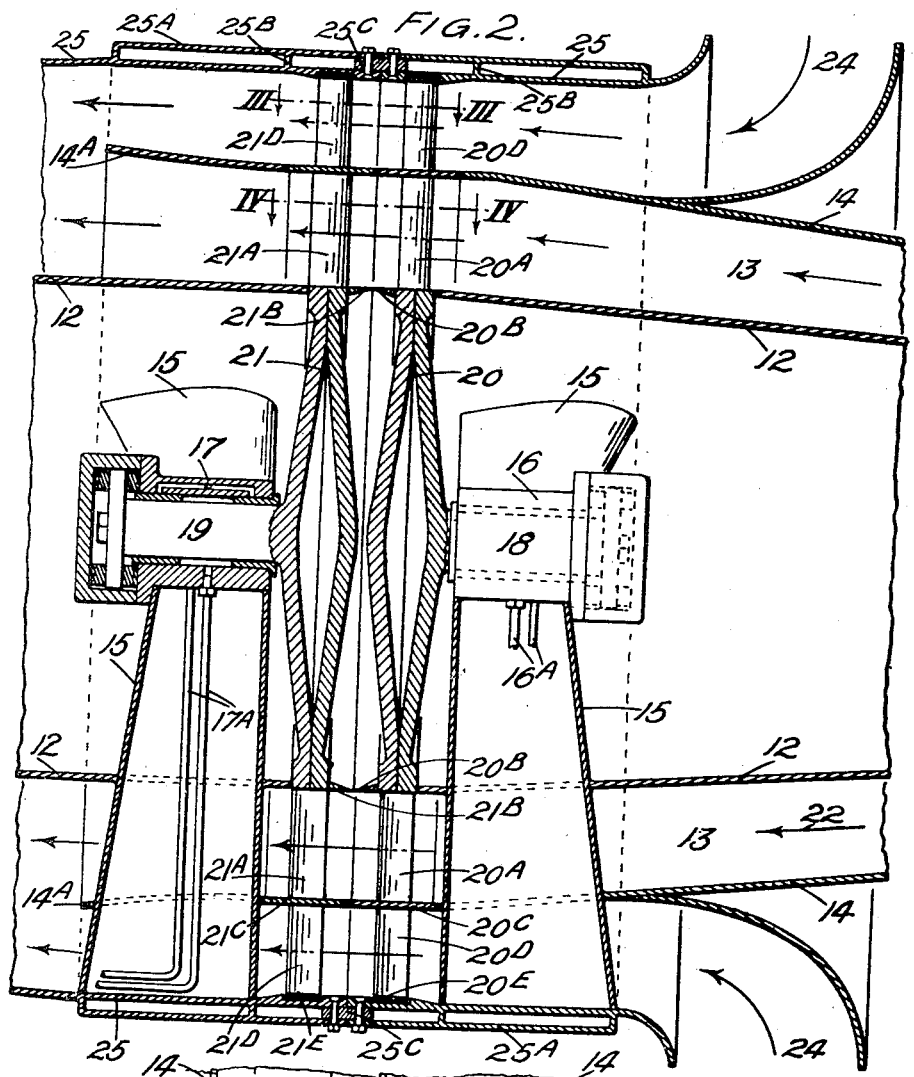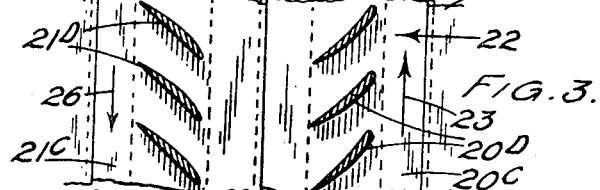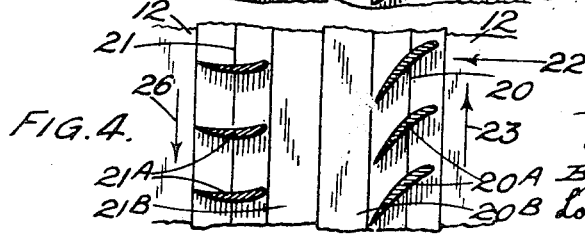

Patented Dec. 7, 1948

2,455,458

UNITED STATES PATENT OFFICE 2,455,458

THRUST AUGMENTING DEVICE FOR A SYSTEM FOR DEVELOPING PROPULSIVE THRUST

Frank Whittle, Rugby, England, assignor to Power Jets (Research and Development) Limited, London, England Application October 23, 1942, Serial No. 463,139
In Great Britain March 2, 1940

3 Claims. (Cl. 60—35.6)

This invention relates to systems for developing propulsive thrust by the reaction of a flow of energised fluid, such as those previously proposed systems for aircraft in which a jet of gas is expelled from a propelling nozzle, the gas having been energised by the imparting thereto of velocity and may be pressure and heat. Such systems have been proposed previously, using apparatus, for example as described in British patent specifications Nos. 456,980 or 471,368. A convenient apparatus for energising the propellant stream is one in which a heat engine comprises the combination of a compressor for air, fuel burning means in the compressed air, and a gas turbine using part of the energy of the resultant gases and mechanically driving the compressor, the gaseous output leaving the turbine forming the propulsive flow. It is preferably—but not necessarily—to a system including such apparatus, that the present invention is applicable.

One object of the present invention is to increase the effective total momentum of fluid discharged in unit time, and so to obtain greater thrust, especially where the system is required to afford great thrust at comparatively low forward speed, i. e. speed relative to the ambient fluid in which the system is operative. Such a requirement may arise especially in connection with the aircraft propulsion where the thrust available at low forward speed, e. g. during take-off, is important. A further object of the invention is to increase the rate of mass flow of propellant fluid through the system at the expense, so to speak, of velocity; in order to reduce losses inseparably with the ducting and emission of fluids at very high velocities. Yet another object is to increase the propulsive efficiency of the system at a given speed, by maintaining a given total momentum in unit time whilst reducing the velocity in the propulsive jet whereby a greater proportion of the energy of the fluid can be converted into useful thrust horsepower.

Further objects of the invention will appear from the following description, but it may be mentioned that they include the provision that the fluid stream for propulsion, at emergence, has no, or no substantial, angular momentum or "whirl," at any rate in design conditions.

According to the invention there are provided in a system for developing propulsive thrust by the reaction of a flow of energised fluid, means for imparting energy from one confined stream of fluid into another confined stream of fluid so as to increase the effective total momentum of fluid discharged in unit time, comprising turbine means arranged in the confines of and driven by one stream, driving impeller means arranged in the confines of and operative in the second stream. By "confined" stream is meant, a stream flowing between or within bounding walls which define the cross-sectional area of the stream. The walls are the "confines" of the stream. Further according to the invention, a propulsive system for an aircraft comprises a gas turbine driving an air compressor in the output of which fuel is burned the gas turbine being driven by the combustion products, the energised gaseous output from the gas turbine forming a propulsive jet (all in manner known per se) and further comprising a pair of oppositely running axial flow turbine wheels arranged within the confines of and driven by the said output, each wheel mechanically driving in respective direction an axial flow air impeller which entrains external air as a confined stream and drives it through a propulsion nozzle in parallel with the said jet. Preferably, blade or equivalent systems are provided to co-operate with said turbine means and impeller means, to render the respective leaving fluid streams free from whirl; such blade systems may comprise stator blades cooperating with the blades of said turbine means and impeller means, respectively, or preferably second turbine and impeller means which, whilst operating to remove whirl, also contribute to the transformation of propulsive energy from one stream to the other. Such second turbine and impeller preferably run in opposite rotational sense to the first. The streams of fluid preferably join before emission as a propulsive jet, and the design is preferably such that the velocity and pressure of the streams are substantially equal when they join. Other features, mainly of construction, are included in the invention and are defined in the appended claims. They envisage constructions wherein impeller blades are carried as radial extensions of turbine blades; the turbine and impeller means are of axial flow type; certain duct arrangements are provided; and arrangements of propulsive units which are diagrammatically illustrated in the drawings about to be described.

A manner of performance of the invention will now be described by way of example, with reference to the accompanying drawings, in which:

Figure 2 is a diagrammatic sectional view of a twin rotor arrangement embodied in Figure 1.

Figures 3 and 4 illustrate the general form and disposition of the blading in Figure 2, taken on respective section-lines III and IV of Figure 2.

Figure 1:
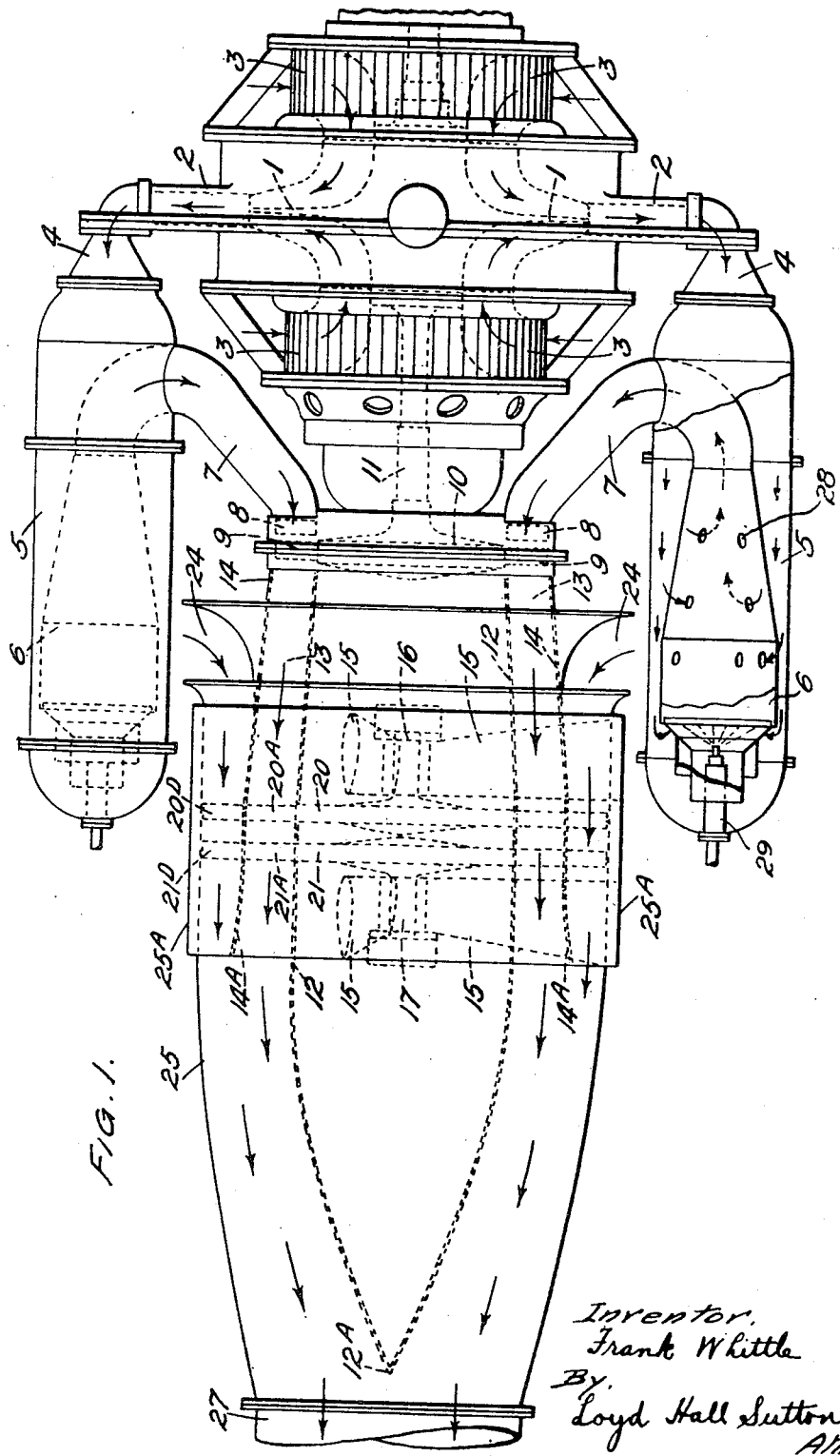
Figure 1 is a diagrammatic general arrangement of a propulsive unit.

Referring to Figure 1, the prime mover in the system comprises a double-intake centrifugal compressor with rotor 1 in casing 2, air intakes being at 3 and the general direction of airflow being indicated by arrows. The air output of the compressor after some diffusion passes through necks 4 into air casings 5 whence as indicated by the arrows it enters flame tubes 6 contained within the air casings through apertures 28 in the wall of said tubes 6. The air meets fuel in the tubes 6 injected by burners 29 and combustion takes place continuously. The gaseous products of combustion together with such (now heated) diluent unburned air as may be present—hereafter collectively called gas—flows from the flame tubes through elbows 7, to pass through a ring of nozzle guide vanes 8, and then impinge on the blades 9 of a gas turbine with disc 10, the shaft 11 of which drives the impeller 1 directly. The whole mechanical or "shaft power" output of the gas turbine, drives the impeller 1 (and such auxiliaries as may be required, which are mounted for driving at the forward end of the system). Behind the turbine disc 10 is an elongated circular-sectional hollow body 12 tapered in streamlined manner to a point at its rearward extremity (12A) and having a circular face immediately behind the disc 10. This body 12 forms the inner wall of an annular gas duct 13 through which flows the gaseous output from the gas turbine. The outer wall of this duct is likewise circular in section and is shown at 14. The compressor, turbine, and duct 13, are arranged coaxially, their axis corresponding to the thrust line of the system. The combination of elements so far described is not claimed to be novel per se. Such a thrust-producing unit can favourably be designed to produce a flow of gas at high velocity, indeed the velocity in the duct 13 may well be supersonic.

The body 12 is supported by two sets of three streamlined hollow radial struts 15, which are carried through the wall 14, and also through the wall of the body 12 inwardly, and within the body 12 each set supports a bearing of which there are consequently two, 16 and 17. Referring now especially to Figure 2, it will be seen that in each bearing runs a spindle 18, 19. The bearings 16, 17, are suitably lined and as well as being journals they constitute thrust bearings, as diagrammatically indicated. Oil pipes such as 16A, 17A, may run through struts 15 to supply and scavenge these bearings. The spindle 18 supports a first rotor or wheel 20 built up of two slightly dished discs inter-attached, the rim of which carries turbine blades 20A projecting from a sealing band 20B and carrying a cylindrical banding ring 20C. This wheel construction is proposed, as favouring internal damping and therefore as a measure against vibration. The edges of the banding 20C are shaped to mate with adjacent edges with as small a clearance as is practicable. Outside the banding 20C, each blade 20A has a radial extension forming an impeller blade 20D, and there may be provided peripherally a shroud ring 20E if this is deemed to be desirable. The spindle 19 supports a second rotor or wheel 21 with turbine blading 21A, sealing band 21B, banding 21C, impeller blading 21D, and may have a shroud ring 21E, all of similar construction to that of the first wheel.

The sealing rings 20B, 21B, at the roots of the turbine blades are arranged in continuity with the wall of the body 12 and the banding 20C, 21C, in continuity with the wall 14, so that the streams passing through the respective rows of blades are locally confined by the rings and banding.

The direction of flow of the gas meeting the first turbine blades 20A is axial, as indicated by the arrow 22. The direction of running of this turbine is illustrated by the arrow 23. The general inclination and direction of camber of the blades 20A can be judged from Figure 4. The impeller blades 20D of the same wheel create a flow of air which enters an annular intake eye 24 from atmosphere, and is led between the confines formed by the outside of the wall 14 and inside of a surrounding outer wall 25 (which parts 14 and 25 thus form, where they are co-extensive axially, an annular air duct), passing through the impeller of the first wheel, which energises the air by accelerating and/or compressing it, but which must necessarily also impart whirl to the air. Be it noticed also, that the gas leaving the turbine blades 20A will have whirl. The inclination, camber, and running direction (arrow 26) of the blades 21A and 21D are such as to operate in the gas and air respectively which strike them, so as to straighten out the flows into axial flow again. This may be regarded as the primary object of the second wheel, though it also serves to transform energy of the gas into energy in the air. Design is preferably such that the two wheels run at equal rotational speeds and since they run oppositely in direction, their gyroscopic effects can by design cancel out through their immediate supporting structures. To make this structure adequately stiff and robust, the wall 25 is reinforced where it supports the struts 15, by means such as the outer skin 25A stabilised by short radial stiffeners 25B. The shroud rings 20E, 21E, run in grooves in the wall 25, and this wall as well as the skin 25A are built with a joint as at 25C to facilitate assembly. The seals 20B, 21B, and the banding 20C, 21C, meet in or practically in, the plane of the joint 25C. This joint is therefore the sole mechanicial connection between the forward part of the body 12, wall 14 and wall 25 all supporting the first wheel, and the rearward corresponding parts all supporting the second wheel. The axial reactions on the wheels themselves are opposed thrust (transmitted through the bearings 16, 17) inwards towards the plane of the joint 25C, which fact may be of assistance in making the joint and establishing close running clearances between the wheel parts.

The wall 14 is somewhat flared at its rear extremity, near 14A, and the termination of the wall 25 which extends rearwardly and becomes convergent (see Fig. 1) surrounding the tapered tail of the body 12, and finally continuing in a jet pipe indicated at 27 which is made of a length and design to suit the purpose in mind and which may open to atmosphere through a propelling nozzle of suitable form.

The cross-sectional area of the gas duct before the first wheel is slightly increased as it progresses downstream, i. e. is a diffuser; and the flared part 14A has like effect. The air duct surrounding it, on the other hand, is somewhat convergent, increasing the air velocity and reducing the pressure. The relationship is designed so that, in the design conditions of operation, the velocity and pressure of the gas which issues from its duct to join the air from the outer duct, equals or as nearly as practicable equals those of the air.

The operation of the double wheel device can be summed up shortly, in saying that the turbine blades of each wheel take up energy from the gas and the respective impeller blades impart the available energy to the air. By this means the mass flow finally used for reaction propulsion is increased. Whilst such energy transformation (the term is used because of the imaginative analogy with the operation of an electrical transformer) is effected by both wheels, it has been indicated that the primary function of the second wheel is to convert the angular momentum or whirl of the fluids leaving the first wheel into useful axial momentum.

It may here be mentioned that when "axial" flow is mentioned it is not intended to preclude a radial component, but merely to distinguish from tangential, rotational, or whirl, movement.

It will have been observed that the pair of wheels rotate in planes normal to the general direction of flow, i. e. to the thrust line; and that in the preferred arrangement these wheels are co-axial with the impeller 1.

What I claim is:

1. In a system for developing propulsive thrust by the reaction of a flow of energized fluid, the combination of a compressor for air, fuel burning means for the compressed air and a gas turbine using part of the energy of the resultant gases and arranged co-axially with the compressor upon a main axis corresponding to the intended line of thrust, exhaust ducting to confine the gas leaving said turbine and extending co-axially therefrom to form a first annular duct, further turbine means comprising a rotor arranged co-axially with respect to said first annular duct to be driven by the gas flowing therein, means forming a second annular duct co-axial with the first to confine separately a second independent stream of fluid received at a lower energy level than the said gas, and impeller means associated with the second duct so as to operate upon the second stream, said impeller means comprising the same rotor as the said further turbine means, the whole being arranged as of substantially circular form about the said main axis.

2. In a system for developing propulsive thrust, including a gas turbine comprising a combustion supporting gas intake compressor, at least one combustion chamber connected to receive combustion supporting gas therefrom and arranged to burn fuel with said gas, a turbine connected to receive and be driven by combustion gases from said combustion chamber, and driving said intake compressor, and a duct for receiving said combustion gases from said turbine, the improvement that comprises a thrust augmentor, including a turbine wheel arranged to receive and be driven solely by gases from said duct, compressor blades mounted on the periphery of said turbine wheel, duct means for supplying external air to said compressor blades, and exhaust ducting arranged to discharge both the combustion gases from said turbine wheel and the external air from said ring of compressor blades.

3. In a system for developing propulsive thrust, including a gas turbine comprising a combustion supporting gas intake compressor, at least one combustion chamber connected to receive combustion supporting gas therefrom and arranged to burn fuel with said gas, a turbine connected to receive and be driven by combustion gases from said combustion chamber, and to drive, in turn, said intake compressor, a duct for receiving said combustion gases from said turbine, the improvement that comprises a thrust augmentor, including a pair of coaxial turbine wheels arranged to receive and be driven in opposite directions solely by combustion gases from said duct and in which there is a ring of compressor blades mounted on the periphery of each of said turbine wheels, thus being driven in opposite directions, the blades on the turbine wheels and the blades on the compressor rings being so arranged as to actuate the turbine wheels and impel the flow of gas through the compressor rings without imparting substantial whirl to the combustion gases and external air passing therethrough, duct means for supplying external air to the rings of compressor blades, and an exhaust duct arranged to receive both the combustion gases from said turbine wheels and the external air from said rings of compressor blades.

FRANK WHITTLE.

REFERENCES CITED

The following references are of record in the file of this patent:

UNITED STATES PATENTS

| Number | Name | Date |
|---|---|---|
| 1,279,128 | Lake | Sept. 17, 1918 |
| 1,873,505 | Stipa | Aug. 23, 1932 |
| 2,168,726 | Whittle | Aug. 8, 1939 |
| 2,216,731 | Birmann | Oct. 8, 1940 |
| 2,286,908 | Goddard | June 16, 1942 |
| 2,409,177 | Allen et al. | Oct. 15, 1946 |

FOREIGN PATENTS

| Number | Country | Date |
|---|---|---|
| 401,863 | France | Aug. 12, 1909 |
| 411,473 | France | Apr. 12, 1910 |